March 18, 1969     A. J. WEATHERHEAD III     3,433,505
HOSE FITTING FOR CONNECTING HOSES OF DIFFERENT SIZES
Filed Oct. 8, 1965     Sheet 1 of 2

INVENTOR
Albert J. Weatherhead III
BY McNenny, Farrington, Pearne & Gordon
ATTORNEYS

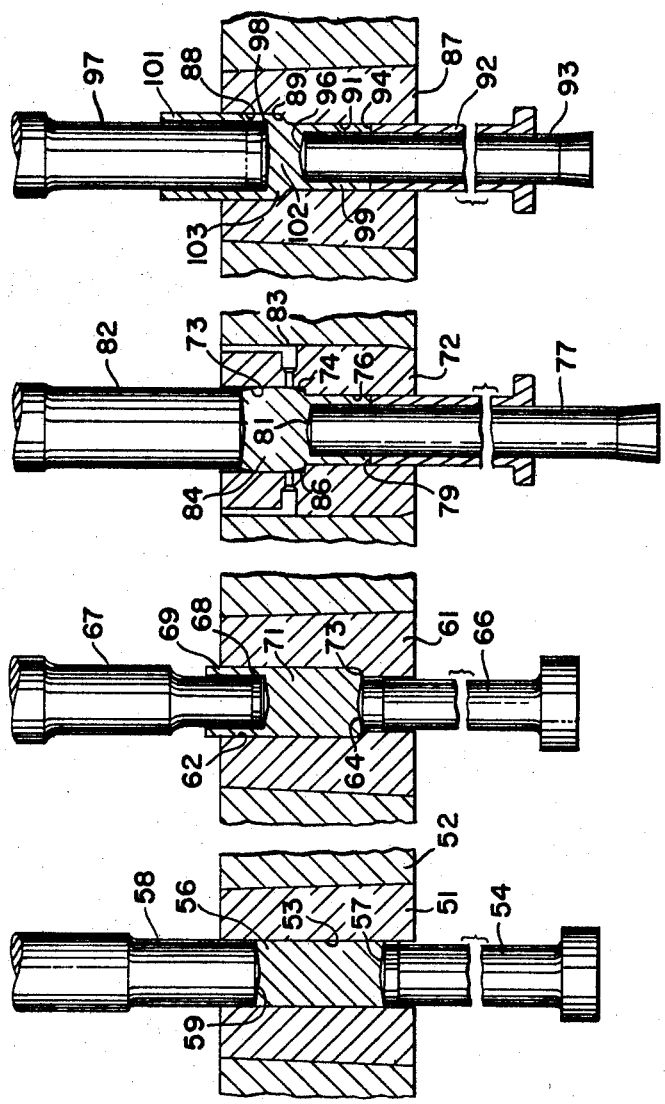

United States Patent Office 3,433,505
Patented Mar. 18, 1969

3,433,505
HOSE FITTING FOR CONNECTING HOSES OF DIFFERENT SIZES
Albert J. Weatherhead III, Shaker Heights, Ohio, assignor to The Weatherhead Company, Cleveland, Ohio, a corporation of Ohio
Filed Oct. 8, 1965, Ser. No. 494,146
U.S. Cl. 285—177                       1 Claim
Int. Cl. F16l *33/00*

ABSTRACT OF THE DISCLOSURE

A hose fitting adapted to couple two flexible hoses of different size. The hose fitting comprises a tubular metallic body formed with opposing radially deformable tubular skirts wherein one skirt has a larger diameter than the other. The central portion of the body is provided with an inwardly extending wall having a tubular nipple extending through an aperture formed therein. One end of the nipple is formed with a reduced diameter which coacts with the smaller diameter to permit gripping of the smaller diameter hose end. The other end of the nipple has a larger diameter and coacts with the larger diameter skirt to permit gripping of the larger diameter hose end. The entire exterior of the tubular metallic body has an axially extending grain structure and is work hardened to substantially uniform hardness greater than the hardness of the substantially unworker inwardly extending wall.

---

This invention relates generally to hose fittings and more particularly to a novel and improved hose fitting adapted to couple two hoses of different size and to the method of manufacturing such fitting.

A fitting incorporating this invention is particularly suited for use in the power steering systems of automobiles, and the like, in which noise dampening is achieved by utilizing a hose assembly connecting the pump and the steering unit wherein the hose assembly utilizes one hose portion of a larger diameter than another hose portion. In such a system it is extremely important that a high degree of reliability be provided and that the manufacturing costs be minimized.

The illustrated embodiment of this invention includes a body formed with opposing skirts of tubular section wherein one skirt has a larger diameter than the other. The central portion of the fitting is provided with an inwardly extending wall with a nipple extending through an aperture formed therein. One end of the nipple is formed with a reduced diameter which coacts with the smaller diameter skirt to permit the gripping of one hose end. The other end of the nipple has a larger diameter and coacts with a larger diameter skirt to permit the connection with the end of the larger diameter hose. After the hose ends are positioned between the nipple and the associated skirt, the skirt is radially deformed to compress the hose end material for sealing engagement between the skirt and the associated nipple end. This provides a permanent sealing connection with the hose ends.

Summary of invention

This invention relates to a hose fitting as described above in which the nipple is a separate part preferably formed on a screw machine, and the body is progressively forged from a cylindrical blank with the opposing skirts backward extruded. The entire exterior of the body thus formed has an axially extending grain structure and is work hardened to substantially uniform hardness greater than the hardness of the substantially unworked inwardly extending wall. The strength of the body in the critical stress areas is thereby greatly increased to prevent cracking when the skirts are radially deformed. A relatively low carbon steel wire may, therefore, be used to manufacture the body and still provide the desired strength characteristics in the resulting article. Furthermore, the radial wall is left relatively soft to minimize the machining costs thereof. The forging of the body also minimizes scrap and thereby reduces the material costs. The radial wall is relatively thick to minimize work hardening and to provide sufficient length to properly position the nipple.

It is still another object of this invention to provide a novel and improved method of forming a hose fitting having opposed tubular skirts by progressively forging a solid cylindrical blank to minimize the material loss as scrap.

It is still another object of this invention to provide a novel and improved method of manufacturing a hose fitting wherein opposed tubular skirts are formed by backward extrusion of the opposite ends of a solid cylindrical blank.

It is another object of this invention to provide a novel and improved method of manufacturing a blank having opposed tubular skirts of different diameters wherein the smaller skirt is extruded on the end of a blank having a diameter substantially equal to the outer diameter of the smaller diameter skirt and the larger skirt is formed by upsetting a portion of the blank to a diameter substantially equal to the outer diameter of the larger diameter skirt and the upset portion is extruded to form the larger diameter skirt.

It is another object of this invention to provide a novel and improved method of forming a blank according to the last preceding object wherein a part of the upset portion is extruded back to its initial diameter.

It is another important object of this invention to provide a novel and improved method for forming a hose fitting having opposed tubular skirts and a central nipple in which the skirts are formed integrally on a body by backward extrusion and the nipple is retained in the body by staking the body to frictionally engage and hold the nipple in place.

Further objects and advantages will appear from the following description and drawings, wherein:

FIGURES 4*a* through 4*d* are cross-sections of the tools and dies for progressively forming the body.

Figure 1:
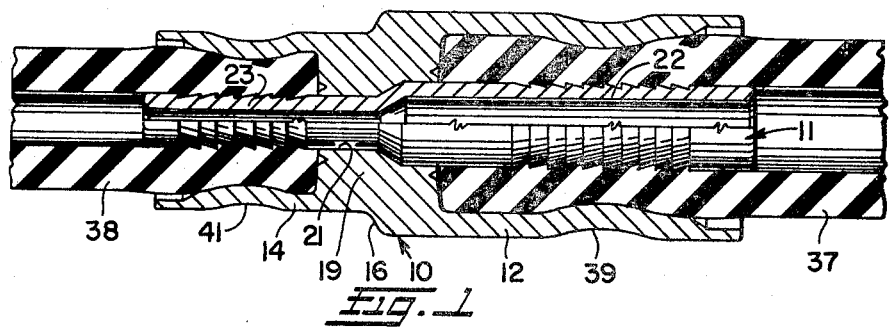
FIGURE 1 is a side elevation in longitudinal section of one preferred form of end fitting incorporating this invention illustrated as it is installed on the ends of two hoses of differing diameters.
Figure 2:
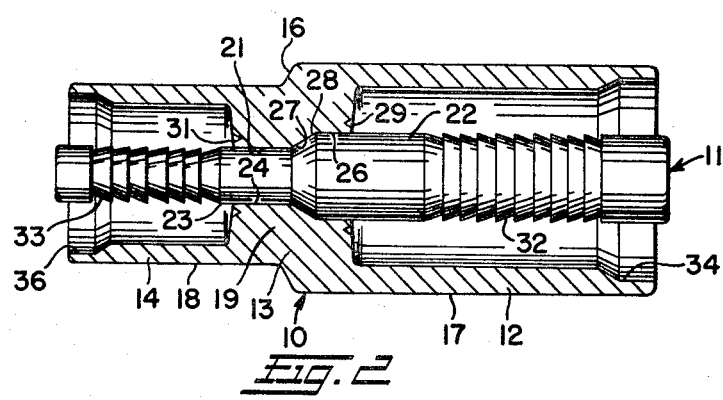
FIGURE 2 is a side elevation, partially in longitudinal section, of the fitting of FIGURE 1 prior to the insertion of the hoses and the crimping of the tubular skirts.

Referring to FIGURES 1 and 2, the illustrated embodiment of a hose fitting incorporating this invention is formed of a body 10 and a nipple 11. Prior to the assembly of the fitting on hose ends the structure is as illustrated in FIGURE 2. The body 10 has a first skirt portion 12 of tubular section extending from one end of the body to a central portion 13 and a second tubular skirt portion 14 extending from the central portion 13 to the other end of the body. The outside diameter 17 of the skirt portion 12 is larger than the outside diameter 18 of the skirt portion 14 so the body is formed with a step 16 in its outer surface at a midsection. The central portion 13 provides an inwardly extending wall 19 defining an axial opening 21 through the central portion which receives the nipple 11.

The tubular nipple 11 is formed with a first end 22 positioned coaxially within the skirt 12 and a second end 23 positioned coaxially within the skirt 14. The diameter of the first end 22 is larger than the diameter of the second end 23 since it is proportioned to receive a larger diameter hose than the end 23. The axial opening 21 is formed with a first portion 24 closely receiving the outside of the end 23 and a larger diameter portion 26 closely receiving the outside of the end 22. The two portions 24 and 26 are joined by a conical section 27 which closely fits a conical wall 28 on the nipple 11.

After the nipple 11 is inserted in the body the wall 19 is staked at 29 and 31 so that the nipple is frictionally gripped and is retained in the assembled position. The end 22 is preferably formed with annular sawtooth grooves 32 to improve the sealing with the hose assembled on that end and similar sawtooth annular grooves 33 are formed on the end 23 for the same purpose. Adjacent the outer ends of the skirts 12 and 14 the body is formed with relief sections 34 and 36, respectively, which resist cutting of the hose during flexing.

The nipple and body are proportioned so that the nipple end 22 fits into a hose 37 and the end 23 fits into the bore of a smaller diameter hose 38. Initially the skirt 12 provides limited clearance with the outside of the hose 37 so that the hose may be pressed into the fitting until the end of the hose engages the wall 19. Subsequently the skirt 12 is radially deformed at 39 to press the hose tightly into sealing engagement with the nipple end 22. Similarly, the skirt 14 initially has a diameter to permit insertion of the hose 38 over the nipple end 23 until it engages the wall 19 and subsequently the skirt 14 is radially crimped or deflected at 41 to press the hose 38 into sealing engagement with the nipple end 23, as illustrated in FIGURE 1. Once the crimping operation is completed the hose ends themselves assist in locking the nipple within the body and a permanent connection is provided.

The assembled fitting provides dual zones of sealing which provide a high degree of reliability. Normally the seal provided between the outer surface of the nipple end 22 and the inner surface of the hose 37 prevents leakage at the large end of the fitting and similarly the outer surface of the nipple end 23 provides sealing engagement with the inner wall of the hose 38. Consequently, fluid under pressure in the two hoses cannot escape. However, in the event that one or the other of the seals provided between the exterior of the nipple and the interior of the associated hose fails for any reason, liquid cannot escape since sealing engagement is provided between the exterior surfaces of the hoses and the skirts 12 and 14. For example, if leakage occurs along the exterior of the nipple end 23 fluid cannot escape from the fitting since sealing engagement is provided along the exterior of the hose 38 by the skirt 14 and the exterior of the hose 37 by the skirt 12. Consequently, with the one piece structure of the body dual sealing is provided even though a fluid-tight joint is not provided between the exterior of the nipple and the opening 21.

Reference should now be made to FIGURES 3 and 4a through 4d, which illustrate a preferred method of forming the body 10. The forging operations are preferably performed in a transfer former having four working stations in which a blank is progressively subjected to forging pressures to produce the final part. Normally in such machines wire stock is fed into the machine and automatically sheared into cylindrical blanks which are then sequentially transferred to each of the die stations until the completed part is produced. The dies at each die station are located in a stationary die breast mounted in the frame and working tools are carried by a reciprocating slide which transports the tool toward and away from the dies. Backup and knockout pins are provided to complete the tooling at each die station.

At the first die station, illustrated in FIGURE 4a, a die 51 is mounted in the die breast 52 and is provided with a through bore 53. The bore 53 cooperates with a knockout pin 54 to define a die cavity which receives the blank 56. The forward end of the knockout tool 54 is formed with a shallow conical end face 57 which extends into close fitting relationship with a wall of the bore 53. A punch 58 is proportioned to closely fit the bore 52 and is also formed with a conical end face 59. When the punch is carried forward to the forwardmost position, as illustrated in FIGURE 4a, the blank 56 is squared and the end faces are smoothed so that the blank 56 is cylindrical in shape with shallow conical depressions in the opposite ends thereof.

After the punch 58 is carried back the knockout 54 moves forward to eject the blank 56 from the die 51 into the transfer which transports the blank into alignment with the die 61 at the second die station, illustrated in FIGURE 4b. A die 61 is formed with a bore 62 extending from its forward face to a radius shoulder 63. Positioned in alignment with the shoulder 63 is a conical end face 64 of a knockout pin 66. The knockout pin 66 in cooperation with the die 61 defines the second die cavity into which the blank 56 from the first die station is injected by a tool 67.

The forward end of the tool 67 is formed with an extrusion land 68 having a diameter less than the diameter of the bore 62 and cooperating therewith to define an annular extrusion throat through which a portion of the blank is backward extruded to form a tubular skirt portion. As the tool 67 is carried forward by the header slide it engages the end of the blank 56 and further forward movement causes backward extrusion between the land 68 and the wall of the bore 62 and produces the skirt 69 on one end of the blank 71. The skirt 69 has a diameter substantially equal to the diameter of the skirt 14 of the finished blank. However, its length is not as long as the finished skirt.

After the tool 67 is carried back by the slide the knockout 66 ejects the blank 71 from the die 61 into a turn-around transfer which transports the blank 61 to a position in alignment with the die 72 at the third die station, illustrated in FIGURE 4c. During the transfer the blank 71 is turned end-for-end so that the skirt 69 is adjacent the die 72.

The die 72 is formed with a first bore 73 extending from the forward face to a shoulder 74 and a second bore 76 of reduced diameter extending from the shoulder 74 to the rearward face of the die. The bore 76 is preferably a few thousandths larger than the outside diameter of the skirt 69 so that it will freely pass into the second bore 76. A backup pin 77 and a tubular ejector or knockout 78 both project into the bore 76 with the end face 79 of the knockout sleeve 78 positioned to engage the end of the skirt 69 and the backup pin 77 extending through the sleeve with its inner end 81 positioned to engage the radial wall at the inner end of the skirt 69. The skirt 69 of the blank 71 fits into the inner end of the die cavity and is supported against further deformation during the working occurring in the third die station. Oil bleeds 83 open to the inner end of the bore 73 to prevent the entrapment of oil adjacent to the shoulder 74.

A tool 82 is provided at the third die station and is proportioned to closely fit the first bore 73. As the tool moves forward it presses the blank 71 into the die until the skirt 69 is fully supported by the tools and then continued forward movement of the tool 82 forms an upset on the unextruded portion of the blank increasing its diameter to a diameter substantially equal to the diameter of the skirt 12 of the finished fitting. At the completion of the upsetting operation the blank 84 is produced. The various elements are proportioned so that the inner end of the upset portion does not completely fill the bore 73 adjacent to the shoulder 74 so there is no tendency for the blank material to lock in the bleeds 83 and the end of the upset adjacent to the shoulder 74 is tapered at 86.

After the tool 82 is carried back from the die 72 the knockout sleeve 78 moves forward ejecting the blank from the die into the transfer fingers which transfer the blank to a position in alignment with a fourth die 87 located in the fourth die station, illustrated in FIGURE 4d. The die 87 is formed with a first bore 88 having a diameter slightly larger than the diameter of the upset on the blank 84 and equal to the outside diameter of the skirt 12 of the finished piece. The bore 88 extends inwardly from the face of the die to a conical shoulder 89 and a second bore 91, having a diameter equal to the outside diameter of the skirt 14 of the finished piece, extends to the rearward face of the die 87. The shoulder 89 intersects the bores 88 and 91 with a radius so that material will flow smoothly during working. Projecting into the bore 91 is a stripper sleeve 92 and a backup pin 93.

In the operation occurring in the fourth die station both forward and backward extrusion occur. The forward extrusion extends the length of the skirt 69 to the finished length thereof and the backward extrusion produces the larger diameter skirt for the skirt 12 of the finished piece. Therefore, the end face 94 of the stripper sleeve 92 is spaced back from the inner end 96 of the backup pin 93 by a distance greater than the length of the skirt 69.

A tool having an extrusion land 98 with a diameter equal to the inside diameter of the skirt 12 is mounted at the fourth die station and as it moves toward the die it presses the blank 84 into the die until the inner end of the bore within the skirt 69 engages the end face 96 of the backup pin 93. Further forward movement of the tool first causes forward extrusion between the exterior surface of the pin 93 and the wall of the bore 91 until the iner end of the blank engages the end face 94 of the stripper sleeve 92. The shoulder 89 is shaped with a generally conical shape having a radius at each end thereof so that a portion of the upset material of the blank is extruded back to a diameter substantially equal to its initial diameter during the first part of the stroke. The upsetting followed by reducing extrusion past the shoulder 89 results in work hardening of the central portion of the blank exterior. When the inner end of the blank engages the end face 94 a skirt 99 is formed on the blank having a length substantially equal to the length of the skirt 14 of the finished blank.

Continued forward movement of the tool 97 then produces backward extrusion between the extrusion land 98 and the wall of the bore 88 and produces a skirt 101 having a length substantially equal to the skirt 12 of the finished blank. Between the forward faces of the pin 93 and the tool 97 the blank has a radial web 102 extending across the full diameter of the blank 103. After the tool 97 is carried back from the die 87 the stripper sleeve 92 is pushed forward to eject the finished blank from the die station.

Figure 3:
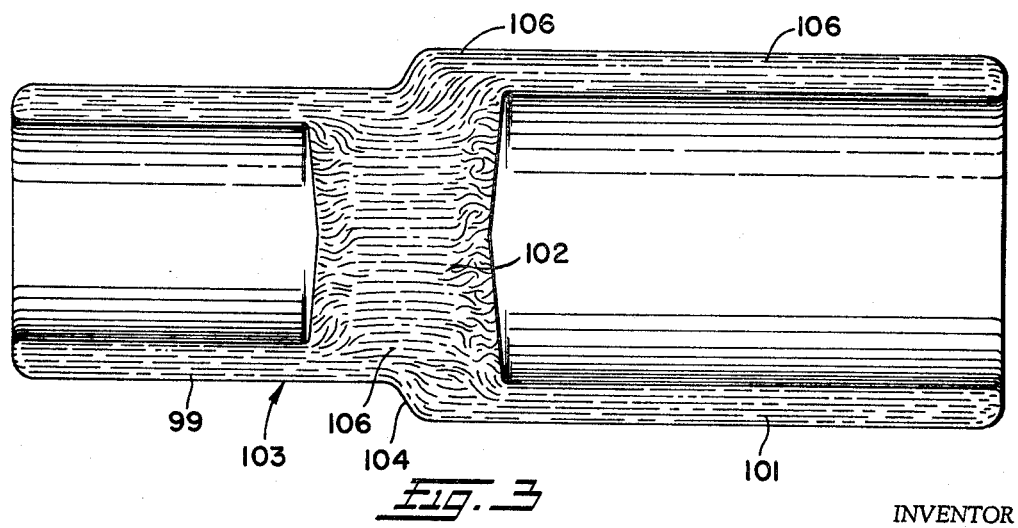
FIGURE 3 is a side elevation in longitudinal section of the body at the completion of the forging operation illustrating the general grain structure of the metal forming the body.

Referring now to FIGURE 3, the blank 103 has a tubular skirt 101 with an inside diameter equal to the inside diameter of the skirt 12 of the finished fitting and an outside diameter equal to the outside diameter of that skirt. The tubular skirt 99 has an inside diameter and an outside diameter equal to the respective diameters of the skirt 14 of the finished blank. The wall 102 extends across the blank between the skirts 99 and 101 providing the wall 19 of the finished blank. A shoulder 104 formed at the shoulder 89 in the die 87 provides the step 16 of the finished fitting.

Grain flow lines 106 illustrate the grain structure of the finished piece. It can be seen that in the two tubular skirt portions 99 and 101 the grain structure of the metal extends generally along the length of the skirts parallel to the axis thereof and that in the outer zone of the central portion the grain structure tends to conform to the outer surface even around the step or shoulder 104. Therefore, the piece has a maximum amount of strength in an axial direction. However, the crimping of the skirt portions during assembly results in deformation in a direction perpendicular to the grain lines. Therefore, the crimping can be easily accomplished without danger of cracking the metal. Pieces manufactured according to this method, from low carbon steel (SAE 1008) have been found to have a hardness, along the zone adjacent their exterior, of about ninety-eight and a hardness variation along the exterior length of the skirts of about five points, both on the Rockwell B scale. Generally, the outer ends of the skirts are slightly softer than the inner ends thereof. Also the average hardness of the exterior is about eight points higher than the Rockwell B average hardness of the wall 102. Since the central wall 102 is relatively soft the opening 21 is easily machined while the exterior of the body has the proper strength to resist damage and to maintain a proper seal when the skirts are deformed inwardly against the assembled hose ends.

A comparison of the shape of the blank 103 and the body 10, illustrated in FIGURE 2, discloses that a minimum amount of machining is required to produce the finished body 10. The end reliefs 34 and 36 are easily machined in the ends of the skirts 101 and 99 and the central passage 21 is easily bored through the wall 102. After the body machining operations are completed the nipple 11 is slipped into place and is stacked in position. Here again, the softness of the material forming the wall facilitates the stacking operation.

The method of producing a fitting incorporating this invention minimizes the scrap and reduces costs as well as producing an improved fitting structure. The hardness of the skirts is higher than the hardness of the central section and the grain structure of the skirts and central sections tends to conform to the exterior and interior shape of the finished piece.

Although a preferred embodiment of this invention is illustrated, it is to be understood that various modifications and rearrangements of parts may be resorted to without departing from the scope of the invention.

I claim:
1. A hose fitting comprising a unitary metallic body formed of work hardened material, said body having a first work hardened tubular skirt extending from one end, a second work hardened tubular skirt having a diameter substantially less than the diameter of said first skirt extending from the other end, and a central portion therebetween with a substantially unworked inwardly extending wall, said skirts having substantially equal thickness, said wall being of axial thickness at least two times greater than the radial thickness of said tubular skirts and having an axial passage extending therethrough, said passage including a larger diameter axial bore having a diameter less than the diameter of either of said skirts, a smaller diameter bore, and a conical section connecting said larger and smaller diameter bores, the length of said passage being at least as great as the diameter of said larger diameter axial bore, and a unitary tubular nipple retained in said passage, said nipple providing a first portion coaxial with said first skirt, a central portion within said passage, and second portion coaxial with said second skirt, said central portion of said nipple including a larger diameter external portion, a smaller diameter external portion, and a conical external portion therebetween, said central portion of said nipple snugly fitting and being retained within said pas- sage, the material of said body along substantially its entire exterior being work hardened to a substantially uniform hardness greater than the hardness of the substantially unworked inwardly extending wall, said skirt portions having greater strength axially than radially, and the grain structure on the metal of said body adjacent to the exterior surface extends generally parallel to said exterior portion.

References Cited

UNITED STATES PATENTS

| | | | |
|---|---|---|---|
| 3,188,117 | 6/1965 | Press et al. | 285—398 X |
| 3,345,090 | 10/1967 | Weatherhead et al. | 285—256 |

FOREIGN PATENTS

| | | |
|---|---|---|
| 462,253 | 11/1913 | France. |

THOMAS F. CALLAGHAN, *Primary Examiner.*

U.S. Cl. X.R.

72—253; 285—256, 398

UNITED STATES PATENT OFFICE
CERTIFICATE OF CORRECTION

Patent No. 3,433,505                                                                      March 18, 1969

Albert J. Weatherhead III

It is certified that error appears in the above identified patent and that said Letters Patent are hereby corrected as shown below:

Column 1, line 27, "unworker" should read -- unworked --. Column 2, after line 14 insert:

It is an important object of this invention to provide a novel and improved hose fitting for permanently connecting the ends of two hoses.

It is still another object of this invention to provide a novel and improved fitting for permanently connecting two hoses of different size.

It is still another object of this invention to provide a novel and improved hose fitting for connecting two hoses wherein the fitting is provided with opposed tubular skirts wherein the skirts are work hardened to increase their strength.

It is still another object of this invention to provide a novel and improved hose fitting having opposed tubular skirts formed on an integral body wherein the grain structure of the metal body extends generally along the axis of the body adjacent to the outer surface thereof.

Column 2, line 29, after "larger" insert -- diameter --. Column 6, line 36, "stacked" should read -- staked --; line 38, "stacking" should read -- staking --.

Signed and sealed this 31st day of March 1970.

(SEAL)
Attest:

EDWARD M.FLETCHER,JR.                                    WILLIAM E. SCHUYLER, JR.
Attesting Officer                                                Commissioner of Patents